US012209485B2

(12) United States Patent
Alissa et al.

(10) Patent No.: US 12,209,485 B2
(45) Date of Patent: Jan. 28, 2025

(54) POLYMER GEL PACKS FOR WELLHEAD CORROSION MITIGATION

(71) Applicant: SAUDI ARABIAN OIL COMPANY, Dhahran (SA)

(72) Inventors: Faisal Mohammed Alissa, Dammam (SA); Norah Aljuryyed, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/066,176

(22) Filed: Dec. 14, 2022

(65) Prior Publication Data

US 2024/0200425 A1 Jun. 20, 2024

(51) Int. Cl.
*E21B 37/06* (2006.01)
*C09K 8/54* (2006.01)

(52) U.S. Cl.
CPC ............... *E21B 37/06* (2013.01); *C09K 8/54* (2013.01); *C09K 2208/32* (2013.01)

(58) Field of Classification Search
CPC ........ C09K 8/54; C09K 2208/32; E21B 37/06
See application file for complete search history.

(56) References Cited

U.S. PATENT DOCUMENTS

| | | | |
|---|---|---|---|
| 2016/0009983 A1 | 1/2016 | Li et al. | |
| 2017/0335648 A1* | 11/2017 | Al-Badran | E21B 33/02 |
| 2018/0094185 A1* | 4/2018 | Singh | C09K 8/035 |
| 2018/0163122 A1 | 6/2018 | Panga et al. | |
| 2019/0119559 A1* | 4/2019 | O'Toole | C09K 8/594 |
| 2021/0172273 A1* | 6/2021 | Hughes | E21B 33/047 |
| 2021/0317708 A1* | 10/2021 | Al-Helal | E21B 15/006 |

FOREIGN PATENT DOCUMENTS

| | | |
|---|---|---|
| CN | 102925128 B | 6/2014 |
| CN | 203626623 U | 6/2014 |
| CN | 107575183 A | 1/2018 |

OTHER PUBLICATIONS

Gelfi, C. and Righetti, P.G. (1981), Polymerization kinetics of polyacrylamide gels I. Effect of different cross-linkers. Electrophoresis, 2: 213-219. https://doi.org/10.1002/elps.1150020404.
Menter, P.A., & Drive, A.N. (2000). Acrylamide Polymerization—A Practical Approach.
Gelfi, C. and Righetti, P.G. (1981), Polymerization kinetics of polyacrylamide gels II. Effect of temperature. Electrophoresis, 2: 220-228. https://doi.org/10.1002/elps.1150020405.
Righetti, P.G., Gelfi, C. and Bosisio, A.B. (1981), Polymerization kinetics of polyacrylamide gels. III. Effect of catalysts. Electrophoresis, 2: 291-295. https://doi.org/10.1002/elps.1150020507.

(Continued)

Primary Examiner — Silvana C Runyan
(74) Attorney, Agent, or Firm — Vorys, Sater, Seymour and Pease LLP

(57) ABSTRACT

A wellhead system for mitigating corrosion thereof may include a polymer gel pack including a polymer gel, the polymer gel pack at least partially surrounding at least a portion of the wellhead. The portions of the wellhead that may be surrounded with the polymer gel pack may include the landing base, the wellhead pipe, the surface casing, the cemented base, or any combination thereof.

15 Claims, 4 Drawing Sheets

(56) References Cited

OTHER PUBLICATIONS

Li Cheng, Yi Qin, Yubin Su, Yuan Pan, Ying Wang, Ruiquan Liao, and Zhen Li. ACS Omega 2022 7 (7), 6151-6159. DOI: 10.1021/acsomega.1c06626.

Akanksha Pragya, Suhas Mutalik, Muhammad Waseem Younas, Siu-Kwong Pang, Pui-Kin So, Faming Wang, Zijian Zheng, and Nuruzzaman Noor. RSC Advances, 2021, 11, 10710-10726. doi.org/10.1039/D0RA09210J.

Can Hui Yang, Mei Xiang Wang, Hussain Haider, Jian Hai Yang, Jeong-Yun Sun, Yong Mei Chen, Jinxiong Zhou, and Zhigang Suo. ACS Applied Materials & Interfaces 2013, 5, 21, 10418-10422. doi.org/10.1021/am403966x.

* cited by examiner

POLYMER GEL PACKS FOR WELLHEAD CORROSION MITIGATION

FIELD OF THE DISCLOSURE

The present disclosure relates generally to mitigation of wellhead corrosion.

BACKGROUND OF THE DISCLOSURE

Wellheads are typically used for producing hydrocarbons, water, and other fluids, and for injection of fluids into a subterranean space. Operation of a wellhead often involves risk of corrosion in many environments, particularly at marine environments, in rainy environments, or where surrounding earth retains water. Corrosion may reduce operational capability and may require costly remediation or replacement of components of the wellhead. One location where corrosion is particularly costly to remediate is the well cellar of a wellhead. The well cellar of a wellhead may be, at least partially underground and, as a result, remediation of corrosion in the well cellar may comprise deep excavation and replacement of components. This may be costly not only due to the expense of replacement but also costly as a result of lost operational capability of the wellhead.

Current methods of mitigating corrosion of the well cellar may involve coatings that may require periodic reapplication. Said reapplication may be costly because of the required excavation of portions of the wellhead that are underground like the well cellar.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

A nonlimiting system of the present disclosure comprises: a wellhead comprising: a landing base; a wellhead pipe, wherein the wellhead pipe extends from the landing base; and a surface casing, wherein the surface casing at least partially surrounds the wellhead pipe; a polymer gel pack comprising a polymer gel, the polymer gel pack at least partially surrounding: the landing base, the wellhead pipe, the surface casing, or any combination thereof.

A nonlimiting method of the present disclosure comprises: providing a wellhead comprising: a landing base; a wellhead pipe, wherein the wellhead pipe extends from the landing base; and a surface casing, wherein the surface casing at least partially surrounds the wellhead pipe; forming a polymer gel pack comprising a polymer gel; surrounding the landing base, the wellhead pipe, the surface casing, or any combination thereof, at least partially, with the polymer gel pack.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
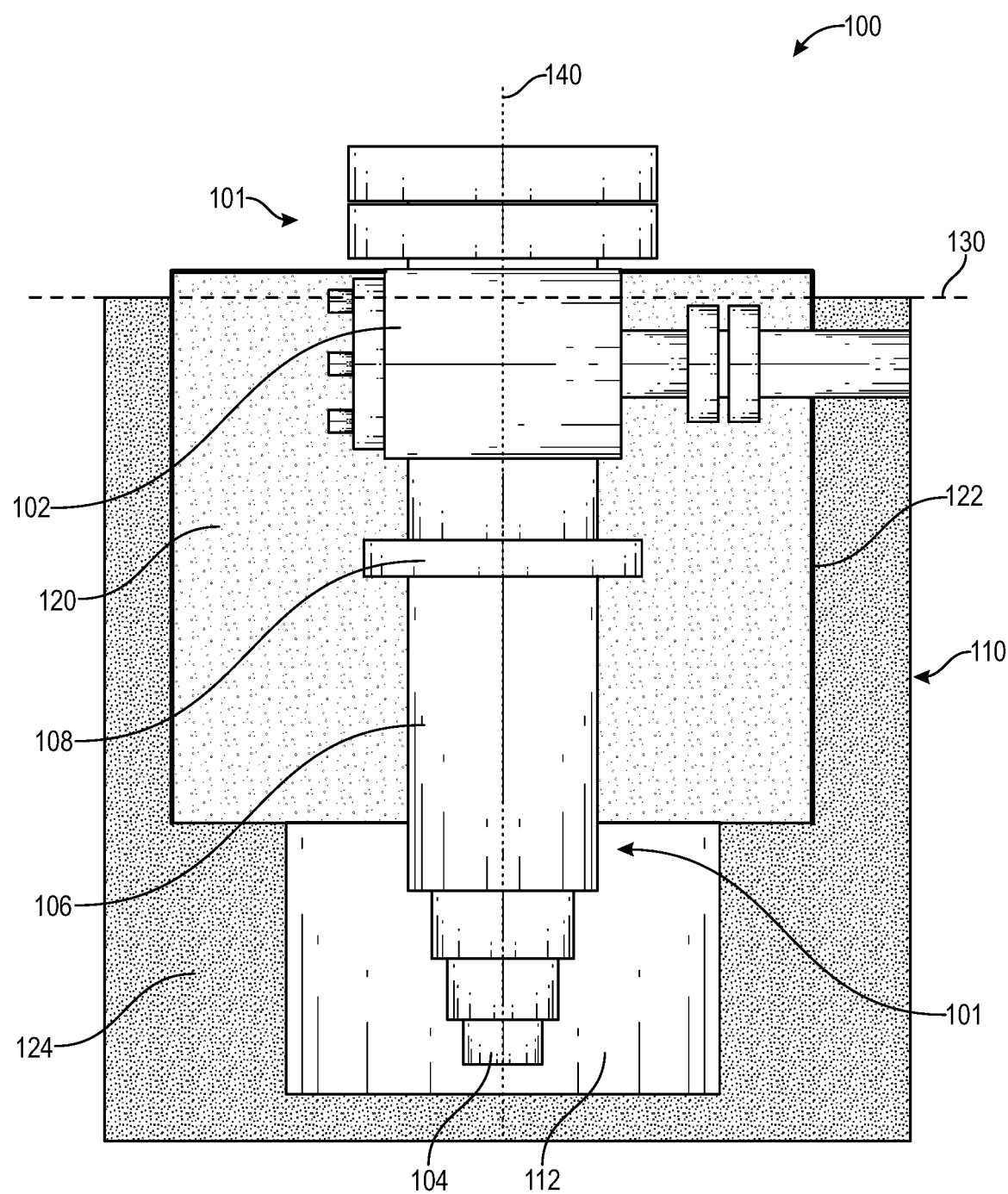
FIG. 1 illustrates a nonlimiting example system comprising a wellhead and a polymer gel pack.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to mitigating wellhead corrosion.

The present disclosure provides systems and methods for mitigating wellhead corrosion, including well cellar corrosion, through the use of a polymer gel pack comprising a polymer gel. Generally, the polymer gel pack described herein surrounds at least a portion of the wellhead within and adjacent to the well cellar, which may include, but is not limited to, the landing base, the wellhead pipe, the surface casing, the cemented base, or any combination thereof. The polymer gel pack may mitigate water ingress, provide chemical corrosion inhibition, or any combination thereof to the portions of the wellhead that the polymer gel pack surrounds.

"Corrosion" as used herein refers to deterioration of a material as a result of contact with a degradative species in its surroundings. In the case of the present disclosure, corrosion may include, but is not limited to, water wetting, scale formation, solid accumulation, or any other corrosion method or type known in the art, as well as any combination thereof.

As used herein when referring to a polymer gel pack surrounding a component of a wellhead, the terms "surrounds," "surrounded by," and the like refer to the polymer gel pack being located radially outward from the centerline of the wellhead at a depth or height of at least a portion of the component of the wellhead. The polymer gel pack may form an arc of any number of circumferential degrees (e.g., a 5° arc to a 360° arc) relative to the centerline of the wellhead at the component of the wellhead. The terms "surrounds," "surrounded by," and the like are similarly applied to the containment structure when referring to a containment structure surrounding a polymer gel pack.

The present disclosure provides systems and methods for mitigating wellhead corrosion that may supplement or replace coatings and other existing corrosion mitigation measures. The polymer gel pack of the present disclosure may mitigate corrosion through mitigating water ingress, through the use of a corrosion inhibitor, or any combination thereof. The polymer gel packs of the present disclosure may be installed at or above ground level to mitigate water absorbing into the ground area from above. Further, the polymer gel packs of the present disclosure may also be installed at least partially below ground to mitigate water ingress from around the wellhead. The polymer gel packs of the present disclosure may extend, for example, a meter or so from the wellhead, which may provide a more durable barrier to water ingress than traditional anti-corrosion paints and coatings that are simply applied to components of the wellhead. The polymer gel packs of the present disclosure may furthermore comprise a chemical corrosion inhibitor which may react with the components of the wellhead, the polymer gel pack, water entering the polymer gel pack, or any combination thereof to reduce the potential for and extent of corrosion of the wellhead.

Maintaining corrosion mitigation over time can be important. For traditional paints and coatings, this may mean that costly excavation of below-ground portions of the wellhead need to occur to re-apply said anti-corrosion paints and coatings. However, advantageously, the polymer gel packs of the present disclosure may be sufficiently sized (e.g., depth, height, distance extending from the wellhead, and the like) to provide robust water ingress mitigation, chemical corrosion inhibition, or any combination thereof such that replacement is needed less often, if even needed, thereby reducing or eliminating the excavation costs. For example, the polymer gel packs of the present disclosure may mitigate ingress of greater than 99 vol % of liquid water from a surface of the polymer gel pack to an interior of the polymer gel pack over a period of 30 days.

A nonlimiting example system according to the present disclosure is shown in FIG. 1. The system 100 may comprise a wellhead 101 that may comprise a landing base 102. The wellhead 101 may further comprise a wellhead pipe 104 extending from the landing base 102. The wellhead 101 may further comprise a surface casing 106 surrounding the wellhead pipe 104. The wellhead 101 may also have a donut plate 108 located on the surface casing 106. The wellhead 101 and constituent components may be located, at least partially, in a well cellar 110. The well cellar 110 may further comprise a cemented base 112, which may surround a portion of the surface casing 106. The centerline of the wellhead 101 is shown by dashed line 140.

The system 100 may further comprise a polymer gel pack 120 that may, at least partially, surround portions of the wellhead 101 including the landing base 102, the wellhead pipe 104, the surface casing 106, the cemented base 112, or any combination thereof. System 100 may comprise a polymer gel pack 120 that is largely below ground level (ground level is indicated by reference character 130). However, as described herein, the polymer gel pack may exist at ground level, below ground level, above ground level, or any combination thereof. The polymer gel pack 120 may at least partially be located within the well cellar 110, may at least partially surround the well cellar 110, or any combination thereof. The system 100 may optionally further comprise providing a containment structure 122 for the polymer gel pack 120. Additionally, in system 100, the polymer gel pack 120 is shown at least partially resting on and at least partially surrounded by ground 124.

Figure 2:
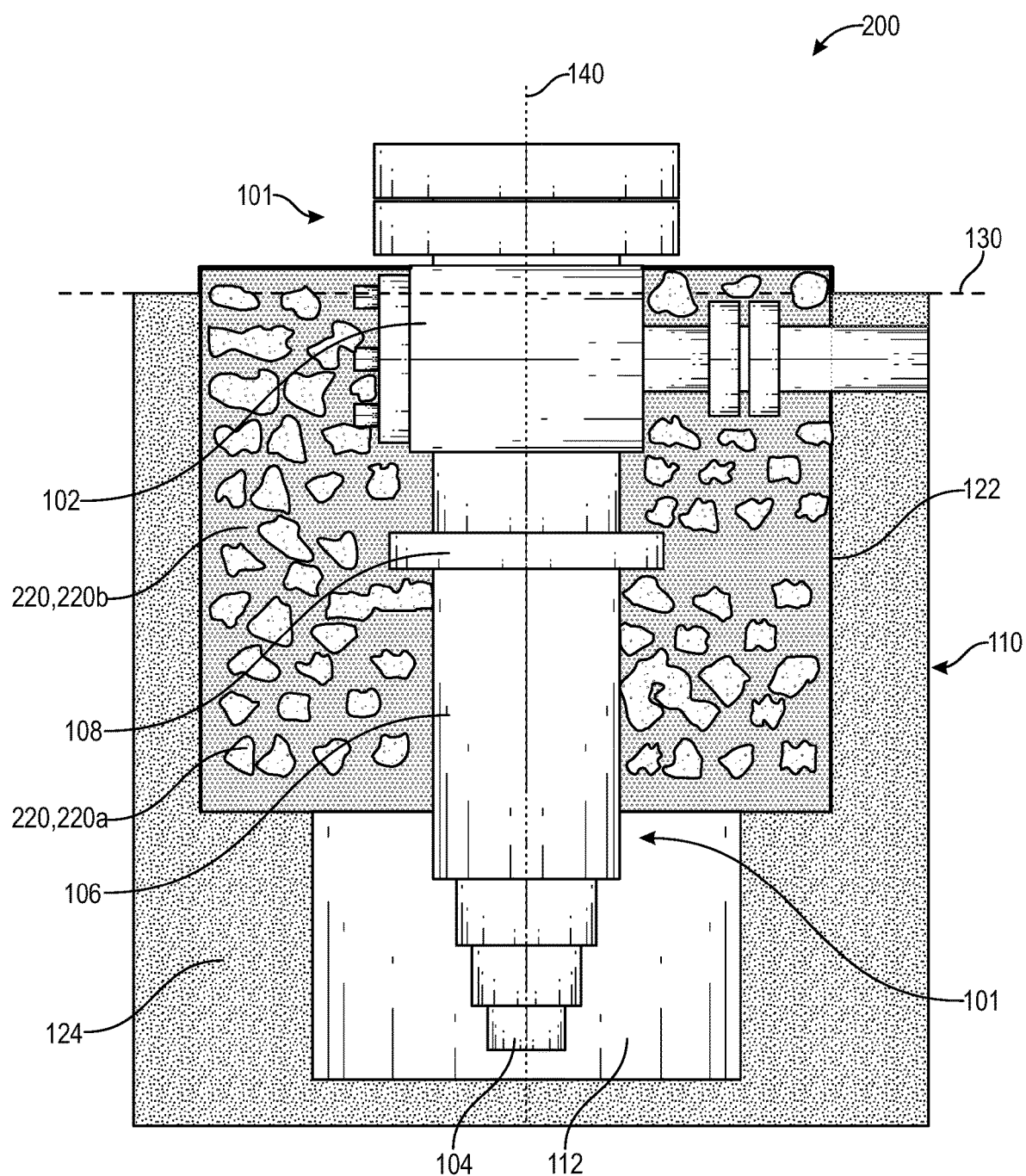
FIG. 2 illustrates an alternative nonlimiting example system comprising a wellhead and a polymer gel pack with a support material.

An alternate nonlimiting example system comprising a polymer gel pack with a support material according to the present disclosure is shown in FIG. 2. With continued reference to FIG. 1, the system 200 comprises a polymer gel pack 220 comprising a polymer gel 220a and a support material 220b. The support material 220b in FIG. 2 is shown as existing between portions of the polymer gel 220a; however, as described below, other suitable configurations may be utilized as part of the present disclosure.

Figure 3:
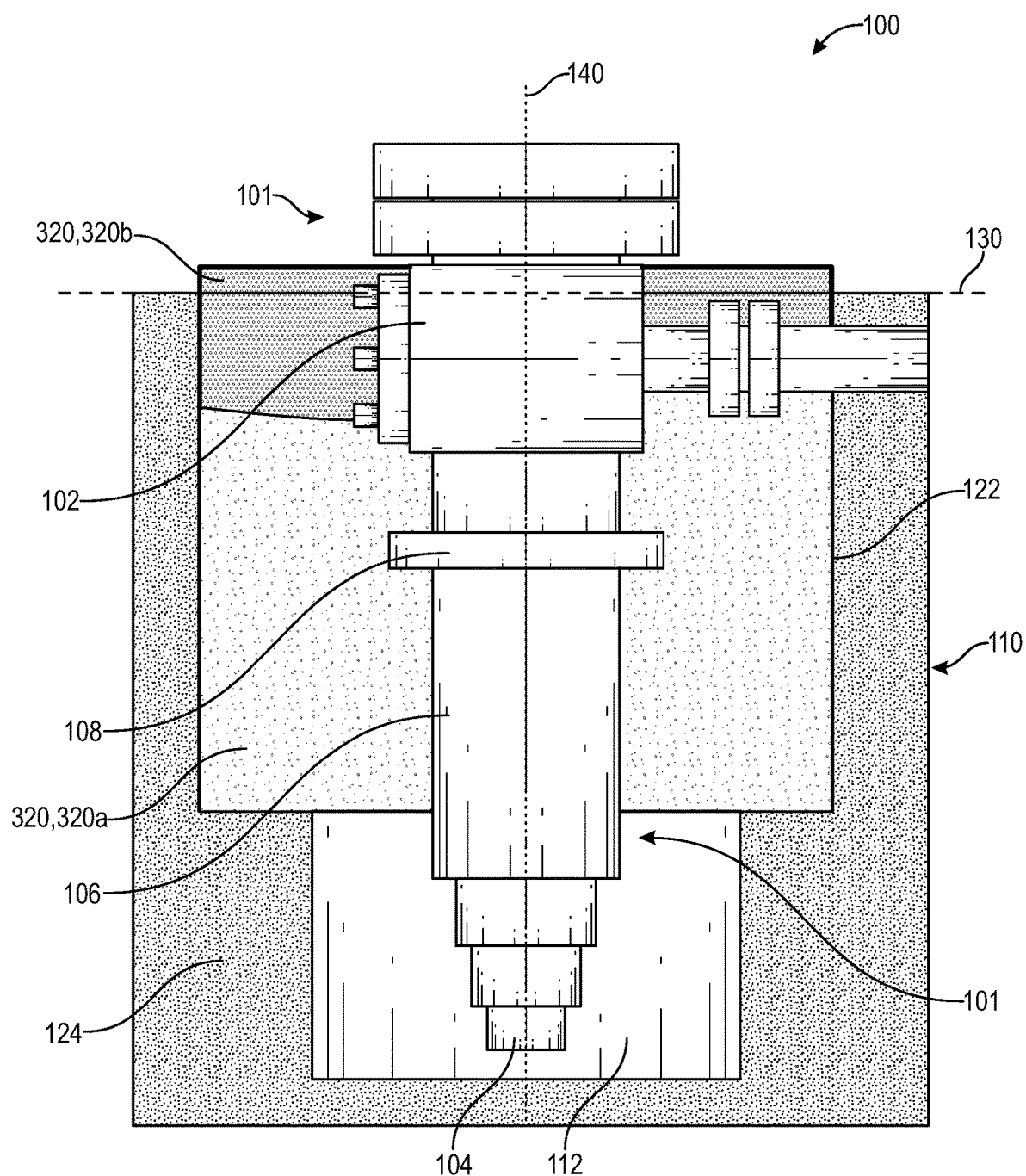
FIG. 3 illustrates an alternative nonlimiting example system comprising a wellhead and a polymer gel pack with a support material.

Another alternate nonlimiting example system comprising a polymer gel pack with a support material according to the present disclosure is shown in FIG. 3. With continued reference to FIG. 1, the system 300 comprises a polymer gel pack 320 comprising a polymer gel 320a and a support material 320b. The support material 320b in FIG. 3 is shown as existing as a layer on top of the polymer gel 320a; however, as described below, other suitable configurations, including, but not limited to, the polymer gel on top of a layer of support material, may be utilized as part of the present disclosure.

Containment Structure

The systems described herein may comprise a containment structure for the polymer gel pack. The containment structure may serve to contain the polymer gel pack at the wellhead. It should be noted that "contain" or "containment" as used herein refers to holding at least a portion (of any size) of a material (e.g., the polymer gel pack) at a desired location and preventing movement relative to the location. Some movement may occur with the use of a containment structure and a portion of the material (e.g., the polymer gel pack) may escape out of the containment structure. The containment structure may be located on top of the polymer gel pack, below the polymer gel pack, beside the polymer gel pack, around the polymer gel pack, within or between portions of the polymer gel pack, or any combination thereof. The containment structure may be any suitable shape and size (including any suitable thickness) for containing the polymer gel pack and may include features such as baffles, netting, pores, and the like, to prevent movement of the polymer gel pack, to allow for draining of fluids that enter the polymer gel pack, or any combination thereof.

The containment structure may exist above ground, below ground, at ground level, or any combination thereof. The containment structure may comprise any suitable material for containing the polymer gel pack including, but not limited to, earth, sand, a rock, a polymer, a metal, wood, concrete, masonry, a fiber, a paper, the like, or any combination thereof.

Polymer Gel Pack

The polymer gel pack may exist above ground level, below ground level, at ground level, or any combination thereof.

The polymer gel pack may have any suitable dimensions. Preferably the polymer gel pack may extend from 0.1 ft to 500 ft, or 0.001 ft to 500 ft, or 1 ft to 100 ft, or 1 ft to 25 ft, or 1 ft to 10 ft, or 1 ft to 5 ft (0.03 m to 152 m, 0.0003 m to 152 m, or 0.3 m to 30 m, or 0.3 m to 7.7 m, or 0.3 m to 3 m, or 0.3 m to 1.5 m) radially from the centerline of the wellhead. The centerline of the wellhead, for the purposes of the present disclosure, may be defined as a largely vertical central line extending from top to bottom down the center of the wellhead and into the wellbore (for example, as shown by dashed line 140 in FIG. 1).

Preferably the polymer gel pack may have a height from 0.1 ft to 500 ft. 0.001 ft to 500 ft, or 1 ft to 100 ft, or 1 ft to 25 ft, or 1 ft to 10 ft, or 1 ft to 5 ft (0.03 m to 152 m, 0.0003 m to 152 m, or 0.3 m to 30 m, or 0.3 m to 7.7 m, or 0.3 m to 3 m, or 0.3 m to 1.5 m). For the purposes of the present disclosure, height of the polymer gel pack may be defined as from the top of the polymer gel pack to the bottom of the polymer gel pack as measured vertically.

Preferably the polymer gel pack may have a depth below ground level from 0.1 ft to 500 ft, or 0.001 ft to 500 ft, or 1 ft to 100 ft, or 1 ft to 25 ft, or 1 ft to 10 ft, or 1 ft to 5 ft (0.03 m to 152 m, 0.0003 m to 152 m, or 0.3 m to 30 m, or 0.3 m to 7.7 m, or 0.3 m to 3 m, or 0.3 m to 1.5 m). For the purposes of the present disclosure, depth of the polymer gel pack may be defined as from ground level to the bottom of the polymer gel pack as measured vertically.

The polymer gel pack may have any suitable shape. The polymer gel pack may be partitioned into two or more portions, which may or may not be in direct contact with other portions.

It should be noted that the shape and dimensions of the polymer gel pack may be restricted by a component of the wellhead, by surrounding equipment, by the features of the surrounding geological environment, the like, or any combination thereof. As a nonlimiting example, the polymer gel pack may rest on and be supported from below by the ground surrounding the wellhead.

A polymer gel pack according to the present disclosure may comprise a polymer gel. The polymer gel may preferably comprise polyacrylamide. The polymer gel may further comprise a co-polymer (formed of a co-monomer), a biopolymer (formed of a bio-monomer), or any combination thereof. Inclusion of a biopolymer may be preferred in some instances as the biopolymer may, in some embodiments, allow for dissolving of the polymer gel pack using an acid (e.g. hydrochloric acid, tetrasodium glutamate diacetate (GLDA), acetic acid, the like, or any combination thereof) for purposes of maintenance, inspection, and the like.

The polymer gel may be formed from polymerization of a base composition. The base composition may comprise acrylamide, optionally other additives (e.g., co-monomers, bio-monomers, oxygen scavengers, corrosion inhibitors, and the like), and a balance of water.

The base composition may comprise acrylamide at a concentration from about 10 wt % to about 50 wt % (or 20 wt % to 40 wt %, or 20 wt % to 30 wt %, or 10 wt % to 30 wt %, or 10 wt % to 20 wt %, or 20 wt % to 30 wt %, or 25 wt % to 35 wt %, or 30 wt % to 40 wt %—wherein "about" applies to each range point) by weight of the base composition.

The base composition may also comprise a co-monomer. The base composition may comprise a co-monomer at a concentration from about 1 wt % to about 30 wt % (or 3 wt % to 20 wt %, or 5 wt % to 15 wt %, or 5 wt % to 20 wt %, or 5 wt % to 25 wt %, or 10 wt % to 25 wt %, or 10 wt % to 30 wt %, or 20 wt % to 40 wt %—wherein "about" applies to each range point) by weight of the base composition. Examples of co-monomers may include, but are not limited to, ethylene diacrylate (EDA), N,N'-bisacrylylcystamine (BAC), N,N'-methylene-bis-acrylamide (bis), N,N'-diallyl-tartardiamide (DADT), N,N'-(1,2-dihydroxuethylene) bisacrylamide (DHEBA), the like, and any combination thereof.

The base composition may comprise a bio-monomer. The base composition may comprise the bio-monomer at a concentration from about 1 wt % to about 30 wt % (or 1 wt % to 20 wt %, or 1 wt % to 5 wt %, or 10 wt % to 20 wt %, or 20 wt % to 30 wt %, or 10 wt % to 30 wt %—wherein "about" applies to each range point) by weight of the base composition, of the bio-monomer. Examples of bio-monomer may include, but are not limited to, a collagen-based monomer, an alginate-based monomer (e.g., sodium alginate, potassium alginate, or any combination thereof), the like, or any combination thereof. Without being bound by theory, the bio-monomer may chemically react with the acrylamide monomer to form a polymer.

Polymerization of the base composition may include: at least partial polymerization of the acrylamide monomer, at least partial polymerization of the co-monomer, at least partial polymerization of the bio-monomer, or any combination thereof. It should be noted that additional components of the base composition may at least partially polymerize; however, there may be components of the base composition that do not, at least partially, polymerize. "Polymerization," and grammatical variants thereof, as used herein, refers to the formation of polymers (e.g., polymer chains, polymer networks, and the like) from monomer molecules.

The base composition may further comprise an oxygen scavenger. The base composition may comprise, from about 0.1 wt % to about 10 wt % (or 1 wt % to 5 wt %, or 1 wt % to 3 wt %, or 0.1 wt % to 3 wt %, or 0.1 wt % to 5 wt %—wherein "about" applies to each range point), by weight of the base composition, of the oxygen scavenger. Examples of oxygen scavengers may include, but are not limited to, sodium sulfite, cobalt sulfate, sodium bisulfite, hydrazine, carbohydrazide, the like, or any combination thereof. Suitable oxygen scavengers include OXYGON™ (organic oxygen scavenger, available from Norchem or Halliburton).

The base composition may further comprise a corrosion inhibitor. The base composition may comprise, from about 1 wt % to about 20 wt % (or 1 wt % to 10 wt %, or 5 wt % to 10 wt %, or 5 wt % to 15 wt %, or 5 wt % to 20 wt %—wherein "about" applies to each range point) by weight of the base composition, of the corrosion inhibitor. Examples of corrosion inhibitors may include, but are not limited to, a quaternary ammonium compound, alkyldimethylbenzylammonium chloride, ammonium bisulfite, an alcohol (e.g., (2-methoxymethylethoxy)-propanol), the like, or any combination thereof. Suitable corrosion inhibitors include HYDROSURE™ O-3670R (a mixture of quaternary ammonium compounds and ammonium hydrogensulphite, available from ChampionX).

In addition to the above described components, the base composition may comprise additional components including, but not limited to, a pH control agent, an antioxidant, a scale inhibitor, a gel stabilizer, the like, or any combination thereof.

Polymerization of the base composition in order to form the polymer gel may occur through activation of the base composition using an activator. The activator (e.g., dispersed in water) may be admixed with the base composition. The activator may be added at a concentration of the active ingredient from about 1 wt % to about 30 wt % (or 1 wt % to 20 wt %, or 1 wt % to 5 wt %, or 10 wt % to 20 wt %, or 20 wt % to 30 wt %, or 10 wt % to 30 wt %—wherein "about" applies to each range point), by weight of the base composition. Examples of activators may include, but are not limited to, tetramethyl ethylenediamine (TEMED), ammonium persulfate, riboflavin, riboflavin-5'-phosphate, the like, and any combination thereof.

The base composition and activator may be mixed at a ratio (base composition to activator ratio by volume), of from 10:1 to 1:1 (10:1 to 1:10, or 10:1 to 1:100, or 100:1 to 1:1).

The base composition may furthermore be crosslinked using a crosslinker. The crosslinker may comprise a multivalent metal salt, including, but not limited to, aluminum chloride, iron chloride, the like, or any combination thereof. The crosslinker may be added to the base composition at a concentration of from 0.0001 mol/L (M, moles of crosslinker per liter of base composition) to 1 M (or 0.0001 M to 0.1 M, or 0.001 M to 1 M, or 0.001 M to 0.1 M).

Crosslinking of the base composition may include: at least partial crosslinking of the acrylamide monomer, at least partial crosslinking of the co-monomer, at least partial crosslinking of the bio-monomer, or any combination thereof. It should be noted that additional components of the base composition may at least partially crosslink; however, there may be components of the base composition that do not, at least partially, crosslink. "Crosslinking," and grammatical variants thereof, as used herein, refers to the formation of chemical bonds between polymer chains of a polymer, wherein the bonds may alter the physical properties of a polymer.

The base composition may be pre-assembled and pre-mixed or may be assembled in-situ immediately prior to polymerization. The polymer gel may be formed before being placed at the wellhead using any suitable mixing method. The polymer gel may be formed in-situ at the wellhead.

The polymer gel pack may further comprise a support compound. The support compound may be mixed with the polymer gel, may exist as at least one layer adjacent to the polymer gel, or any combination thereof. The support compound comprise any suitable material including, but not limited to, sand, dirt, earth, silt, the like, or any combination thereof. The support compound may be added prior to polymerization of the polymer gel, during polymerization of the polymer gel, after polymerization of the polymer gel, or any combination thereof.

Without being bound by theory, the polymer gel pack may inhibit corrosion by mitigating liquid water ingress to the wellhead, through reaction of compounds in the polymer gel pack with the surrounding environment, or any combination thereof. Mitigating liquid water ingress may comprise mitigating contact of liquid water with structures of the wellhead that typically would react with the liquid water in a corrosion reaction.

The polymer gel may also have minimal swelling when contacted with liquid water. The polymer gel of the polymer gel pack may exhibit less than 1% swelling by volume upon being covered on an upward facing side with an equal volume of liquid water at 85° F. (29.4° C.) over a period of 24 hours.

The polymer gel pack may be, at least partially, compacted. "Compacted" as used herein refers to a material (e.g., polymer gel) that is compressed to cause the material to have a smaller volume.

The present disclosure may provide a method for mitigating wellhead corrosion utilizing the systems described herein. The method may include providing a wellhead comprising a landing base, providing a wellhead pipe wherein the wellhead pipe extends from the landing base, and providing a surface casing wherein the surface casing at least partially surrounds the wellhead pipe. The method may further include at least partially surrounding, with a polymer gel pack comprising polymer gel, the landing base, the wellhead pipe, the surface casing, or any combination thereof.

For the purpose of these simplified schematic illustrations and description, there may be additional valves, actuators, pumps, temperature sensors, electronic controllers, and the like that are customarily employed in wellhead or wellbore operations and that are well known to those of ordinary skill in the art but are not shown or described within the present disclosure.

Additionally, the compositions described herein may include additional additives and impurities that are well-known to those of ordinary skill in the art.

Example 1

Figure 4C:
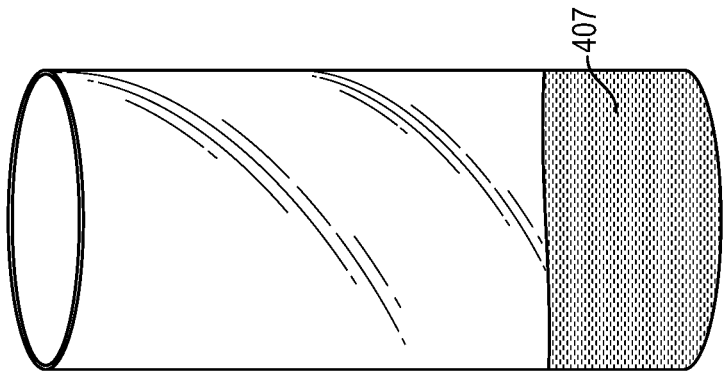
FIG. 4A-C illustrates experimental setups for polymer gel formation according to the present disclosure.
Figure 4B:
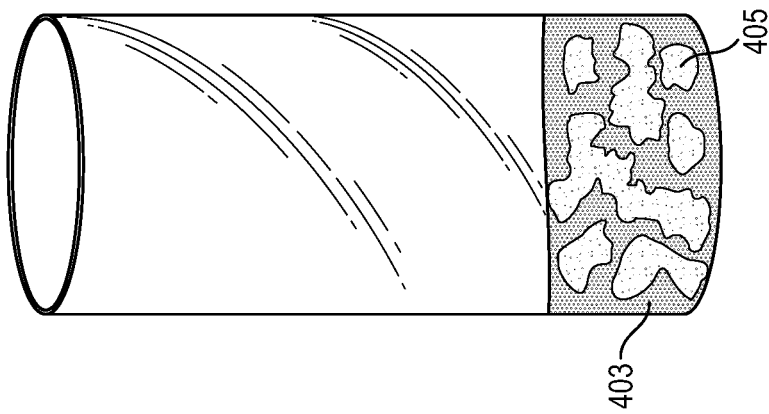
Figure 4A:
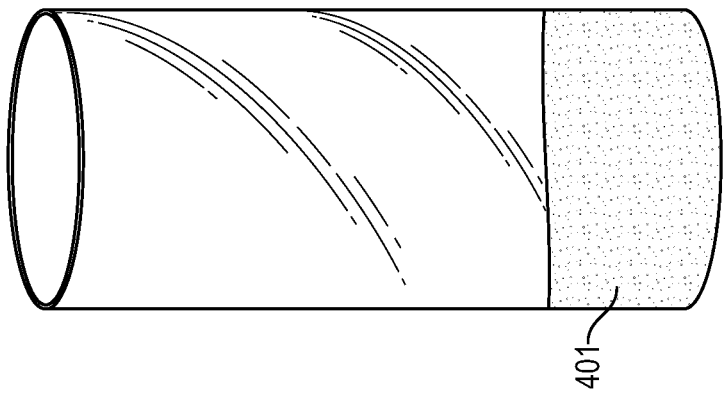

In a glass tube, a first fluid (a base composition comprising acrylamide) and a second fluid (a fluid comprising activator) were combined. The tube was stirred by hand to mix the solutions. A gel 401 formed and precipitated on the bottom of the tube, as shown in FIG. 4A.

Example 2

In a glass tube, the first and second fluids of Example 1 were combined. The tube was stirred by hand to mix the solutions. Subsequently, sand was added before gel formation. A gel 403 formed at the bottom of the tube with sand 405 in between portions of the gel 403, as shown in FIG. 4B. The results showed that the gel can form with sand.

Example 3

In a glass tube, the first and second fluids of Example 1 and a third fluid (a fluid comprising corrosion inhibitor and oxygen scavenger) were combined. The tube was stirred by hand to mix the solutions. A gel 407 formed and precipitated at the bottom of the tube, as shown in FIG. 4C. The results showed that the gel can form in presence of the additives such as corrosion inhibitor and oxygen scavenger.

ADDITIONAL EMBODIMENTS

Embodiment 1. A system comprising: a wellhead comprising: a landing base; a wellhead pipe, wherein the wellhead pipe extends from the landing base; and a surface casing, wherein the surface casing at least partially surrounds the wellhead pipe; a polymer gel pack comprising a polymer gel, the polymer gel pack at least partially surrounding: the landing base, the wellhead pipe, the surface casing, or any combination thereof.

Embodiment 2. The system of Embodiment 1, wherein the wellhead further comprises a cemented base, and, optionally, wherein the polymer gel pack at least partially surrounds the cemented base.

Embodiment 3. The system of Embodiment 1 or 2, wherein the polymer gel comprises polyacrylamide.

Embodiment 4. The system of Embodiment 3, wherein an activator of the polyacrylamide comprises tetramethyl ethylenediamine, ammonium persulfate, or any combination thereof.

Embodiment 5. The system of any one of Embodiments 1-4, wherein the polymer gel further comprises: a co-polymer; a biopolymer; an oxygen scavenger; a corrosion inhibitor; or any combination thereof.

Embodiment 6. The system of Embodiment 5, wherein the co-polymer comprises a co-monomer, and wherein the co-monomer comprises ethylene diacrylate, N,N'-bisacrylylcystamine, or any combination thereof.

Embodiment 7. The system of Embodiment 5, wherein the biopolymer comprises a bio-monomer, and wherein the bio-monomer comprises sodium alginate, potassium alginate, or any combination thereof.

Embodiment 8. The system of Embodiment 5, wherein the oxygen scavenger comprises sodium sulfite, cobalt sulfate, or any combination thereof.

Embodiment 9. The system of Embodiment 5, wherein the corrosion inhibitor comprises a quaternary ammonium compound, alkyldimethylbenzylammonium chloride, ammonium bisulfite, (2-methoxymethylethoxy)-propanol, or any combination thereof.

Embodiment 10. The system of any one of Embodiments 1-9, wherein a crosslinker of the polymer gel comprises aluminum chloride, iron chloride, or any combination thereof.

Embodiment 11. The system of any one of Embodiments 1-10, wherein an interior of the polymer gel pack is, at least partially, in contact with: the landing base, the wellhead pipe, the surface casing, a cemented base, or any combination thereof.

Embodiment 12. The system of any one of Embodiments 1-11, wherein the polymer gel pack is located at least partially within a well cellar, at least partially surrounds the well cellar, or any combination thereof.

Embodiment 13. The system of any one of Embodiments 1-12, further comprising a containment structure, wherein the containment structure is designed to contain the polymer gel pack at the wellhead.

Embodiment 14. The system of Embodiment 13, wherein the containment structure is above ground level, below ground level, at ground level, or any combination thereof.

Embodiment 15. The system of Embodiment 13, wherein the containment structure comprises earth, sand, a rock, a polymer, a metal, wood, concrete, masonry, a fiber, or any combination thereof.

Embodiment 16. The system of any one of Embodiments 1-15, wherein the polymer gel pack extends from 0.1 ft to 500 ft (0.03 m to 152 m) radially from a centerline of the wellhead.

Embodiment 17. The system of any one of Embodiments 1-16, wherein the polymer gel pack has a height from 0.1 ft to 500 ft (0.03 m to 30 m).

Embodiment 18. The system of any one of Embodiments 1-17, wherein the polymer gel pack has a depth below ground level from 0.1 ft to 500 ft (0.03 m to 30 m).

Embodiment 19. The system of any one of Embodiments 1-18, wherein the polymer gel pack further comprises a support compound.

Embodiment 20. A system comprising: a wellhead comprising: a landing base; a wellhead pipe, wherein the wellhead pipe extends from the landing base; and a surface casing, wherein the surface casing at least partially surrounds the wellhead pipe; a polymer gel pack comprising a polymer gel, wherein the polymer gel comprises polyacrylamide, a co-polymer, an oxygen scavenger, and a corrosion inhibitor, and wherein the polymer gel pack at least partially surrounds and is at least partially in contact with: the landing base, the wellhead pipe, the surface casing, or any combination thereof; and a containment structure, wherein the containment structure is designed to contain the polymer gel pack at the wellhead.

Embodiment 21. A method comprising: providing a wellhead comprising: a landing base; a wellhead pipe, wherein the wellhead pipe extends from the landing base; and a surface casing, wherein the surface casing at least partially surrounds the wellhead pipe; forming a polymer gel pack comprising a polymer gel; surrounding the landing base, the wellhead pipe, the surface casing, or any combination thereof, at least partially, with the polymer gel pack.

Embodiment 22. The method of Embodiment 21, wherein forming the polymer gel pack comprises polymerizing, at least partially, a base composition comprising, from 20 wt % to 40 wt %, by weight of the base composition, acrylamide.

Embodiment 23. The method of Embodiment 22, wherein the polymerizing comprises admixing, to the base composition, an activator, wherein the activator has a concentration of an active ingredient from 1 wt % to 30 wt % by weight of the base composition, and wherein the activator comprises tetramethyl ethylenediamine, ammonium persulfate, or any combination thereof.

Embodiment 24. The method of Embodiment 22, further comprising: crosslinking, at least partially, the base composition with a crosslinker, wherein the crosslinker comprises aluminum chloride, iron chloride, or any combination thereof.

Embodiment 25. The method of Embodiment 22, wherein the base composition further comprises: from 3 wt % to 20 wt %, by weight of the base composition, co-monomer; from 1 wt % to 30 wt %, by weight of the base composition, bio-monomer; from 1 wt % to 3 wt %, by weight of the base composition, oxygen scavenger; from 5 wt % to 10 wt %, by weight of the base composition, corrosion inhibitor; or any combination thereof.

Embodiment 26. The method of Embodiment 25, wherein the co-monomer comprises ethylene diacrylate, N,N'-bisacrylylcystamine, or any combination thereof.

Embodiment 27. The method of Embodiments 25-26, wherein the bio-monomer comprises sodium alginate, potassium alginate, or any combination thereof.

Embodiment 28. The method of any one of Embodiments 25-27, wherein the oxygen scavenger comprises sodium sulfite, cobalt sulfate, or any combination thereof.

Embodiment 29. The method of any one of Embodiments 25-28, wherein the corrosion inhibitor comprises a quaternary ammonium compound, alkyldimethylbenzylammonium chloride, ammonium bisulfite, (2-methoxymethylethoxy)-propanol, or any combination thereof.

Embodiment 30. The method of any one of Embodiments 21-29, wherein the wellhead further comprises a cemented base, and, optionally, wherein the polymer gel pack at least partially surrounds the cemented base.

Embodiment 31. The method of any one of Embodiments 21-30, wherein an interior of the polymer gel pack is, at least partially, in contact with: the landing base, the wellhead pipe, the surface casing, a cemented base, or any combination thereof.

Embodiment 32. The method of any one of Embodiments 21-31, wherein the polymer gel pack is located at least partially within a well cellar, at least partially surrounds the well cellar, or any combination thereof.

Embodiment 33. The method of any one of Embodiments 21-32, further comprising a containment structure, wherein the containment structure is designed to contain the polymer gel pack at the wellhead.

Embodiment 34. The method of Embodiment 33, wherein the containment structure is above ground level, below ground level, at ground level, or any combination thereof.

Embodiment 35. The method of Embodiment 33, wherein the containment structure comprises earth, sand, a rock, a polymer, a metal, wood, concrete, masonry, a fiber, or any combination thereof.

Embodiment 36. The method of any one of Embodiments 21-35, wherein the polymer gel pack extends from 0.1 ft to 500 ft (0.03 m to 152 m) radially from a centerline of the wellhead.

Embodiment 37. The method of any one of Embodiments 21-36, wherein the polymer gel pack has a height from 0.1 ft to 500 ft (0.03 m to 30 m).

Embodiment 38. The method of any one of Embodiments 21-37, wherein the polymer gel pack has a depth below ground level from 0.1 ft to 500 ft (0.03 m to 30 m).

Embodiment 39. The method of any one of Embodiments 21-38, wherein the polymer gel pack further comprises a support compound.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A system comprising:
a wellhead comprising:
a landing base;
a wellhead pipe extending from the landing base; and
a surface casing at least partially surrounding the wellhead pipe;
a polymer gel pack comprising a polymer gel, the polymer gel pack surrounding: the landing base, the wellhead pipe, the surface casing, or any combination thereof, wherein forming the polymer gel pack comprises polymerizing, at least partially, a base composition comprising:
acrylamide at 20 wt % to 40 wt % by weight of the base composition, and
a co-monomer at from about 3 wt % to about 20 wt % by weight of the base composition,
a bio-monomer from about 1 wt % to about 30 wt % by weight of the base composition,
an oxygen scavenger at from about 1 wt % to about 3 wt % by weight of the base composition, and
a corrosion inhibitor at from about 5 wt % to about 10 wt % by weight of the base composition.

2. The system of claim 1, wherein an activator of the polyacrylamide comprises tetramethyl ethylenediamine, ammonium persulfate, or any combination thereof.

3. The system of claim 1, wherein the co-monomer comprises ethylene diacrylate, N,N'-bisacrylylcystamine, or any combination thereof.

4. The system of claim 1, wherein the bio-monomer comprises sodium alginate, potassium alginate, or any combination thereof.

5. The system of claim 1, wherein the oxygen scavenger comprises sodium sulfite, cobalt sulfate, or any combination thereof.

6. The system of claim 1, wherein the corrosion inhibitor comprises a quaternary ammonium compound, alkyldimethylbenzylammonium chloride, ammonium bisulfite, (2-methoxymethylethoxy)-propanol, or any combination thereof.

7. The system of claim 1, wherein an interior of the polymer gel pack is, at least partially, in contact with: the landing base, the wellhead pipe, the surface casing, a cemented base, or any combination thereof.

8. The system of claim 1, wherein the polymer gel pack further comprises a support compound.

9. A system comprising:
a wellhead comprising:
a landing base;
a wellhead pipe extending from the landing base; and
a surface casing at least partially surrounding the wellhead pipe;
a polymer gel pack comprising a polymer gel, wherein forming the polymer gel pack comprises polymerizing, at least partially, a base composition comprising:
acrylamide at 20 wt % to 40 wt % by weight of the base composition, and
a co-monomer at from about 3 wt % to about 20 wt % by weight of the base composition,
a bio-monomer from about 1 wt % to about 30 wt % by weight of the base composition,
an oxygen scavenger at from about 1 wt % to about 3 wt % by weight of the base composition, and
a corrosion inhibitor at from about 5 wt % to about 10 wt % by weight of the base composition;
wherein the polymer gel pack surrounds and is at least partially in contact with: the landing base, the wellhead pipe, the surface casing, or any combination thereof; and
a containment structure, wherein the containment structure is designed to contain the polymer gel pack at the wellhead.

10. A method comprising:
providing a wellhead comprising:
a landing base;
a wellhead pipe extending from the landing base; and
a surface casing at least partially surrounding the wellhead pipe;
forming a polymer gel pack comprising a polymer gel, wherein forming the polymer gel pack comprises polymerizing, at least partially, a base composition comprising acrylamide at 20 wt % to 40 wt % by weight of the base composition;

wherein the base composition further comprises:
- a co-monomer at from about 3 wt % to about 20 wt % by weight of the base composition,
- a bio-monomer from about 1 wt % to about 30 wt % by weight of the base composition,
- an oxygen scavenger at from about 1 wt % to about 3 wt % by weight of the base composition, and
- a corrosion inhibitor at from about 5 wt % to about 10 wt % by weight of the base composition, surrounding the landing base, the wellhead pipe, the surface casing, or any combination thereof, with the polymer gel pack.

11. The method of claim 10, wherein the polymerizing comprises admixing, to the base composition, an activator, wherein the activator has a concentration of an active ingredient from about 1 wt % to about 30 wt % by weight of the base composition, and wherein the activator comprises tetramethyl ethylenediamine, ammonium persulfate, or any combination thereof.

12. The method of claim 10, further comprising:
crosslinking, at least partially, the base
composition with a crosslinker, wherein the crosslinker comprises aluminum chloride, iron chloride, or any combination thereof.

13. The method of claim 10, wherein the co-monomer comprises ethylene diacrylate, N,N'-bisacrylylcystamine, or any combination thereof.

14. The method of claim 10, wherein the bio-monomer comprises sodium alginate, potassium alginate, or any combination thereof.

15. The method of claim 10, wherein the oxygen scavenger comprises sodium sulfite, cobalt sulfate, or any combination thereof.

\* \* \* \* \*